US007782741B2

(12) United States Patent
Roelofs et al.

(10) Patent No.: US 7,782,741 B2
(45) Date of Patent: Aug. 24, 2010

(54) PROBE-SCANNED FERROELECTRIC MEDIA WITH IMPRINTED REGIONS

(75) Inventors: Andreas Karl Roelofs, Pittsburgh, PA (US); Martin Gerard Forrester, Murrysville, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 888 days.

(21) Appl. No.: 11/654,987

(22) Filed: Jan. 18, 2007

(65) Prior Publication Data
US 2008/0175133 A1    Jul. 24, 2008

(51) Int. Cl.
G11B 9/00    (2006.01)
(52) U.S. Cl. ........................................ 369/126; 369/121
(58) Field of Classification Search ........................ None
See application file for complete search history.

(56) References Cited

U.S. PATENT DOCUMENTS

| 5,777,977 | A  | * | 7/1998 | Fujiwara et al. | 369/126 |
|---|---|---|---|---|---|
| 5,886,922 | A  |  | 3/1999 | Saito et al. | 365/164 |
| 6,111,284 | A  |  | 8/2000 | Sakurai | 257/310 |
| 6,284,654 | B1 |  | 9/2001 | Roeder et al. | 438/681 |
| 6,728,093 | B2 |  | 4/2004 | Fox | 361/303 |
| 7,026,676 | B2 |  | 4/2006 | Ahner et al. | 257/295 |
| 7,221,639 | B2 | * | 5/2007 | Onoe et al. | 369/126 |
| 2002/0033991 | A1 |  | 3/2002 | Hester | 359/290 |
| 2002/0136927 | A1 |  | 9/2002 | Hieda et al. | 428/684 |
| 2003/0008418 | A1 |  | 1/2003 | Eason et al. | 438/3 |
| 2003/0047764 | A1 |  | 3/2003 | Joo | 257/295 |
| 2003/0142614 | A1 | * | 7/2003 | Cho et al. | 369/126 |
| 2003/0157734 | A1 |  | 8/2003 | Engelhardt et al. | 438/3 |
| 2003/0201475 | A1 |  | 10/2003 | Uchiyama et al. | 257/295 |
| 2004/0016952 | A1 |  | 1/2004 | Sawasaki | 257/310 |
| 2004/0027935 | A1 |  | 2/2004 | Cho et al. | 369/43 |
| 2004/0042351 | A1 |  | 3/2004 | Onoe et al. | 369/13.01 |
| 2004/0047246 | A1 |  | 3/2004 | Onoe et al. | 369/13.11 |
| 2004/0071924 | A1 |  | 4/2004 | Yang et al. | 428/65.3 |
| 2004/0180144 | A1 |  | 9/2004 | Nagashima et al. | 427/372.2 |
| 2005/0098532 | A1 | * | 5/2005 | Onoe et al. | 216/22 |
| 2005/0099895 | A1 |  | 5/2005 | Maeda et al. | 369/13.01 |
| 2005/0128616 | A1 |  | 6/2005 | Johns et al. | 360/15 |
| 2005/0213364 | A1 |  | 9/2005 | Kijima et al. | 365/145 |
| 2006/0018239 | A1 |  | 1/2006 | Nam et al. | 369/126 |
| 2006/0023601 | A1 | * | 2/2006 | Tachino et al. | 369/59.1 |
| 2006/0023606 | A1 |  | 2/2006 | Lutwyche et al. | 369/100 |

OTHER PUBLICATIONS

Imprint: An Important Failure Mechanism of Ferroelectric Thin Films in View of Memory Applications; Ph.D thesis of M. Grossmann; Jun. 22, 2001.
The "Millipede"—Nanotechnology Entering Data Storage; P. IEEE Transactions on Nanotechnology, vol. 1, No. 1, Mar. 2002.
A Survey of Circuit Innovations in Ferroelectric Random-Access Memories; Proceedings of the IEEE, vol. 88, No. 5, May 2000.

* cited by examiner

Primary Examiner—Paul Huber
(74) Attorney, Agent, or Firm—David C. Bohn; Westman, Champlin & Kelly, P.A.

(57) ABSTRACT

Ferroelectric media includes a media surface that is scannable by a contact. The contact provides a read signal. A polarization pattern is written in first regions of the media surface. The polarization pattern represents position data. The first regions are selectively exposed to an energy source. The exposing provides an imprint to the polarization pattern that prevents subsequent erasure by the read signal.

20 Claims, 9 Drawing Sheets

SECTION 1C-1C

REWRITABLE

PROBE-SCANNED FERROELECTRIC MEDIA WITH IMPRINTED REGIONS

FIELD OF THE INVENTION

The present invention relates generally to ferroelectric data storage media scanned by probes, and more particularly but not by limitation to reading of servo marks for use in probe position servo control circuitry.

BACKGROUND OF THE INVENTION

In data storage drives, user data is stored on tracks of storage media. A transducer or probe is positioned to move along a track to write and read user data on the storage media. In addition to the user data, position data is also provided on the storage media.

The position data can include servo marks that, when read, generally indicates position coordinates (e.g., X, Y coordinates, or track number, cylinder number, sector number) of the transducer or probe relative to the media surface. Position data can also include preambles that indicate local alignment between a track and the transducer or probe; A wide variety of formats for servo marks and preambles are known. With areal densities available in conventional magnetic storage drives, lithographic techniques (which include deposits of radiation sensitive layers), have adequate resolution to effectively define servo marks on the magnetic media.

The data storage drive includes a servo system (feedback system) that positions the transducer or probe over a selected track based on feedback of the position data. The servo system typically has a "seek mode" that moves the transducer or probe from one track to another track based on reading servo marks. The servo system also typically has a "tracking mode" in which the transducer or probe is precisely aligned with a selected track based reading on preamble data.

At the time of manufacture of a magnetic data storage drive, the servo marks are positioned on the storage media. During operational use of the data storage drive, the servo marks are read by the transducer or probe, but there is typically no need to erase and rewrite servo data during operation. The position of conventional magnetic servo sector data on the media is therefore stable and does not creep significantly during the operational life of the data storage drive.

There is a desire to increase the storage capacity of data storage media and also a desire to reduce the size and weight of data storage media on new designs. This leads to a need for increased areal density for the data storage media that can't be met with conventional storage technologies.

Scanning probe storage based on ferroelectric media (FeProbe) can be used to provide the increased areal density. There are, however, new problems that arise with the increased areal density and with FeProbe itself that are not present in earlier storage devices.

In particular, there is a desire to increase areal densities to a level where servo marks have length scales on the order of only several tens of nanometers. It is not practical to define servo marks at this small length scale using conventional lithographic capabilities, and other methods must be found to provide servo marks.

Servo marks (or other position data) can be polarized on the ferroelectric memory itself at this small length scale, however, the characteristics of FeProbe do not permit stable positioning of servo sector data. When data is read from FeProbe with a probe, the conventional process of reading the data inherently erases (removes) the data from the FeProbe. An electronic circuit that provides the read operation of FeProbe data must follow up and automatically provide a subsequent write operation of the same FeProbe data in order to avoid loss of the data on the ferroelectric media. This is not an insurmountable problem for user data. With position data (e.g., servo marks), however, the repeated reading and automatic rewriting of position marks will inevitably lead to creep of the positions of the position marks and loss of accurate position information. This instability or loss of accurate position information limits the useful life of the FeProbe device. Adjacent FeProbe tracks with user data will become misaligned due to position creep of position data. User data tracks will eventually overwrite or interfere with one another.

A method and apparatus are needed to provide FeProbe with position data that has locations on the ferroelectric media that are adequately stable. There is a desire to provide position data that can be conveniently read with the same probe and electronics that are used to read user data. There is also a desire to provide position data that can't be erased by the probe and electronics used to read user data, and which provides an electronic signal as similar as possible to the user data. Aspects of the present invention provide solutions to these and other problems, and offer other advantages over the prior art.

SUMMARY OF THE INVENTION

Disclosed is an apparatus and a method that comprises providing ferroelectric media. The ferroelectric media includes a media surface that is scannable by a contact. The contact provides a read signal.

The method comprises writing a polarization pattern representing position data in first regions of the media surface. The method comprises selectively exposing the first regions to an energy source. The exposing provides an imprint to the polarization pattern that prevents subsequent erasure by the read signal.

In one aspect, the selective exposing comprises provision of an imprint to substantially all of the media surface, and then selective removal of the imprint with a controlled energy source to remove the imprint from media surfaces other than the first regions.

In another aspect, the selective exposing comprises scanning the media surface with a controllable energy source. The controllable energy source applies a higher energy level to the first regions to provide the imprint, and the energy source applies a lower energy level that does not imprint to regions other than the first regions.

Other features and benefits that characterize aspects of the present invention will be apparent upon reading the following detailed description and review of the associated drawings.

DETAILED DESCRIPTION OF ILLUSTRATIVE EMBODIMENTS

In the aspects described below, probe scanned ferroelectric media is provided with position information recorded in first regions (e.g., servo sectors) that are then selectively imprinted. The selective imprinting makes the first regions resistant to erasure. The first regions can be read many times without the need to rewrite the first regions. The location of the position information is fixed on the media and there is no risk of the position creeping over time due to rewriting.

Imprinting is a defect or performance limitation in ferroelectric capacitors such as lead zirconate titanate (PZT) capacitors or Strontium Bismuth Tantalate (SBT) capacitors. As described below, the advantageous use of imprinting failure mechanism is used in probe-scanned ferroelectric data storage drives such as the drive 10 described below in connection with FIG. 1A.

Figure 1A:
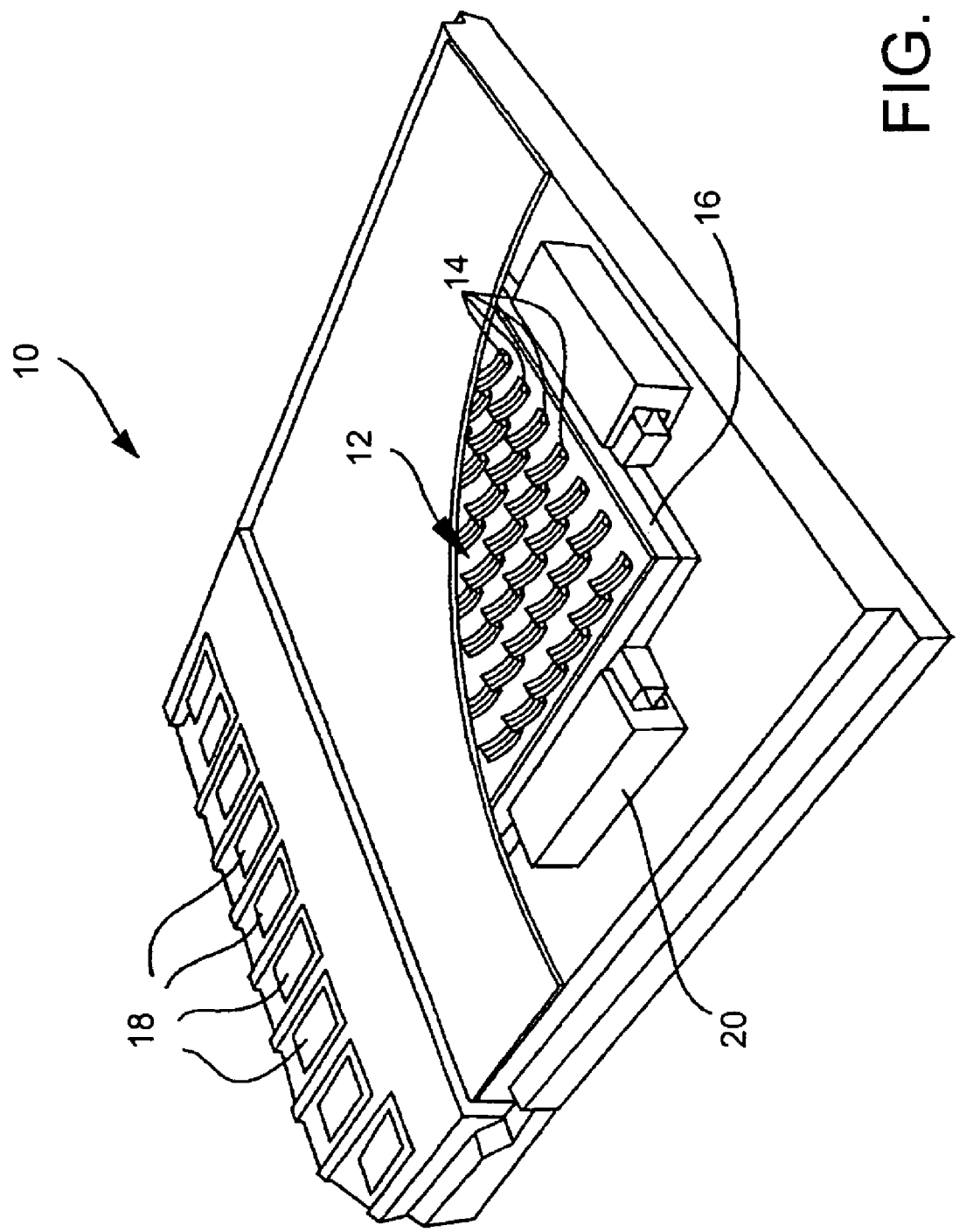
FIGS. 1A, 1B, 1C illustrate exemplary probe-scanned ferroelectric data storage drives.

FIG. 1A illustrates an exemplary ferroelectric data storage (FeRAM) drive 10 in which aspects of the invention are useful. The drive 10 comprises a ferroelectric storage medium 16 with a scannable surface 12. An array of probes 14 contact the scannable surface 12 and communicate data to and from the scannable surface 12. Microactuators such as microactuator 20 provide relative scanning motion between the scannable surface 12 and the probes 14. Electrical connector 18 provides connections between the drive 10 and a host computer system.

Figure 1B:
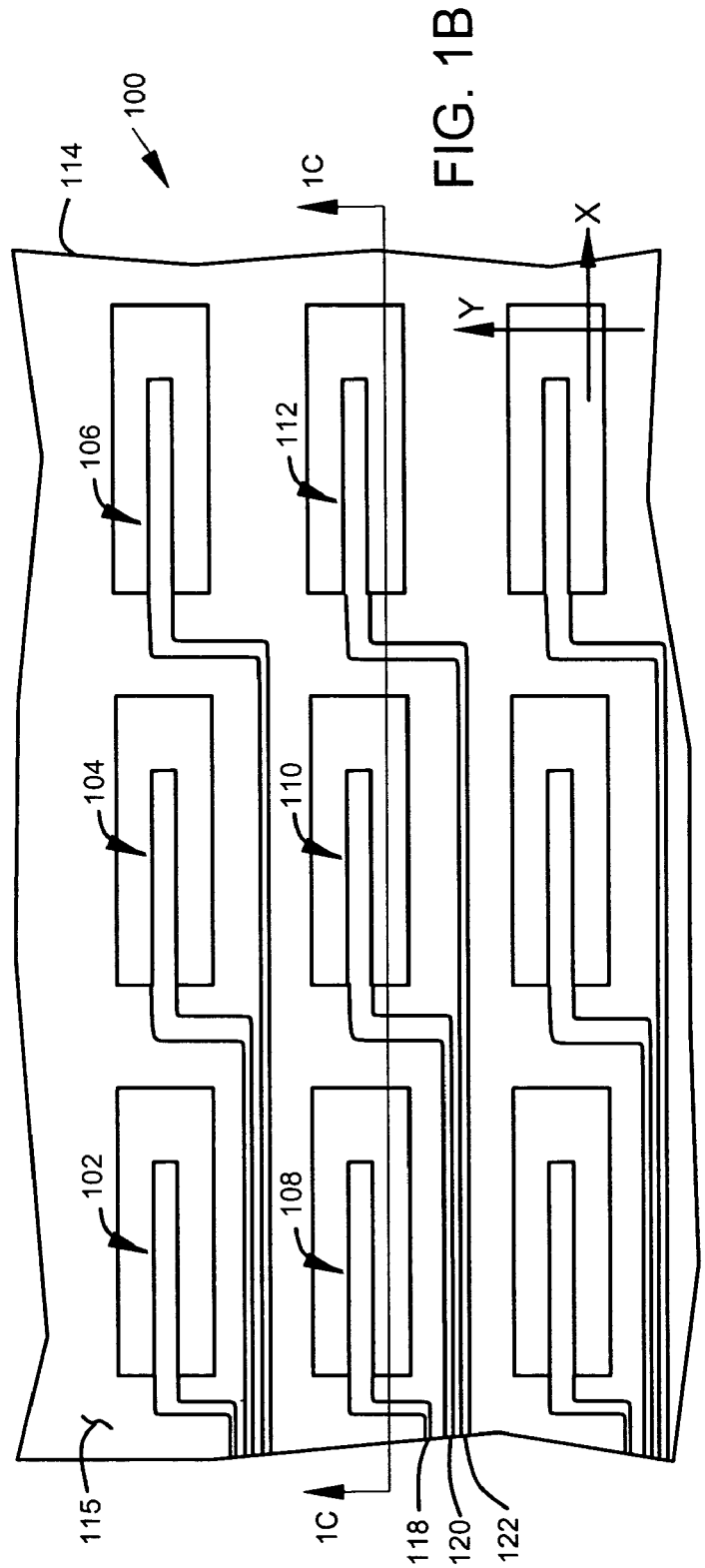
Figure 1C:
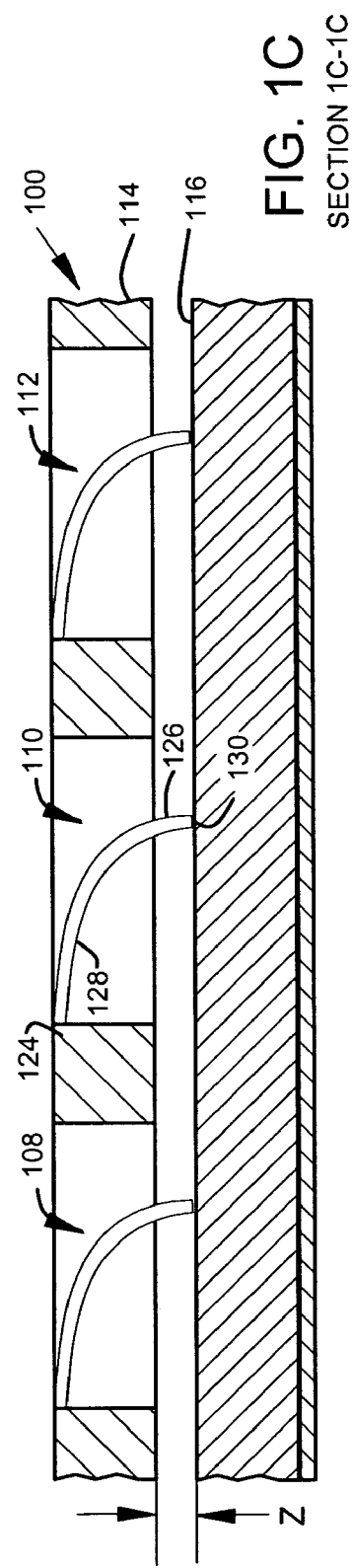

FIGS. 1B-1C illustrate an array 100 of sensing contact probes 102, 104, 106, 108, 110, 112 that are formed in cavities of a substrate 114. FIG. 1B illustrates a top (plan) view of the array 100, and FIG. 1C illustrates a front cross-sectional view taken along line 1C-1C in FIG. 1B.

The substrate 114 provides a common probe support for the sensing contact probes 102, 104, 106, 108, 110, 112. Substrate 114 is only partially shown in FIGS. 1B, 1C and can extend to support a larger number of sensing contact probes that are not illustrated in FIGS. 1B, 1C. The sensing contact probes 102, 104, 106, 108, 110, 112 are preferably arranged in a regular rectangular array, as illustrated, or in oblique alignments. The substrate 114 is movable relative to a surface 116 (FIG. 1C) along X and Y axes to provide scanning of the surface 116 by the sensing contact probes 102, 104, 106, 108, 110, 112. The controlled spacing Z is typically selected to provide a desired force preload magnitude between the surface 116 and each of the sensing contact probes. The preload force deflects the sensing contact probes 102, 104, 106, 108, 110, 112 so that the sensing contact probes 102, 104, 106, 108, 110, 112 preferably function as springs. Relative motion between the substrate 114 and the surface 116 can be effected by motion of the substrate 114, motion of the surface 116, or motion of both the substrate 114 and the surface 116.

Substrate 114 and surface 116 are illustrated as flat elements in FIGS. 1B-1C, however, the substrate 114 and the surface 116 can have other shapes such as round cylindrical shapes. The surface 116 comprises a surface of a ferroelectric memory that is accessed by the probes 102, 104, 106, 108, 110, 112. Relative motion between the substrate 114 and the surface 116 can be any suitable scanning motion such as random access scanning, raster scanning, or other known surface scanning motions or patterns. With the use of multiple probes, a large number of bits of data can be written or read simultaneously (in parallel) to provide high speed access.

Exemplary conductor leads 118, 120, 122 run over a top surface 115 of the substrate 114 to carry information to and from the sensing contact probes 108, 110, 112. The conductor leads 118, 120, 122 couple to electronic circuitry (not illustrated) that can be located on the substrate surface 115 or elsewhere.

An exemplary sensing contact probe such as sensing contact probe 110 comprises a beam support 124 (a portion of the substrate 114) and a probe 126. The probe 126 comprises a bent beam body 128 extending from the beam support 124 to a contact face 130 spaced apart from the beam support 124. The aspects illustrated in FIGS. 1A, 1B, 1C are illustrative, and other known probe and data storage scanning arrangements can also be used as well. The ferroelectric media surface 116 is described in more detail below in connection with an example illustrated in FIG. 2.

Figure 2:
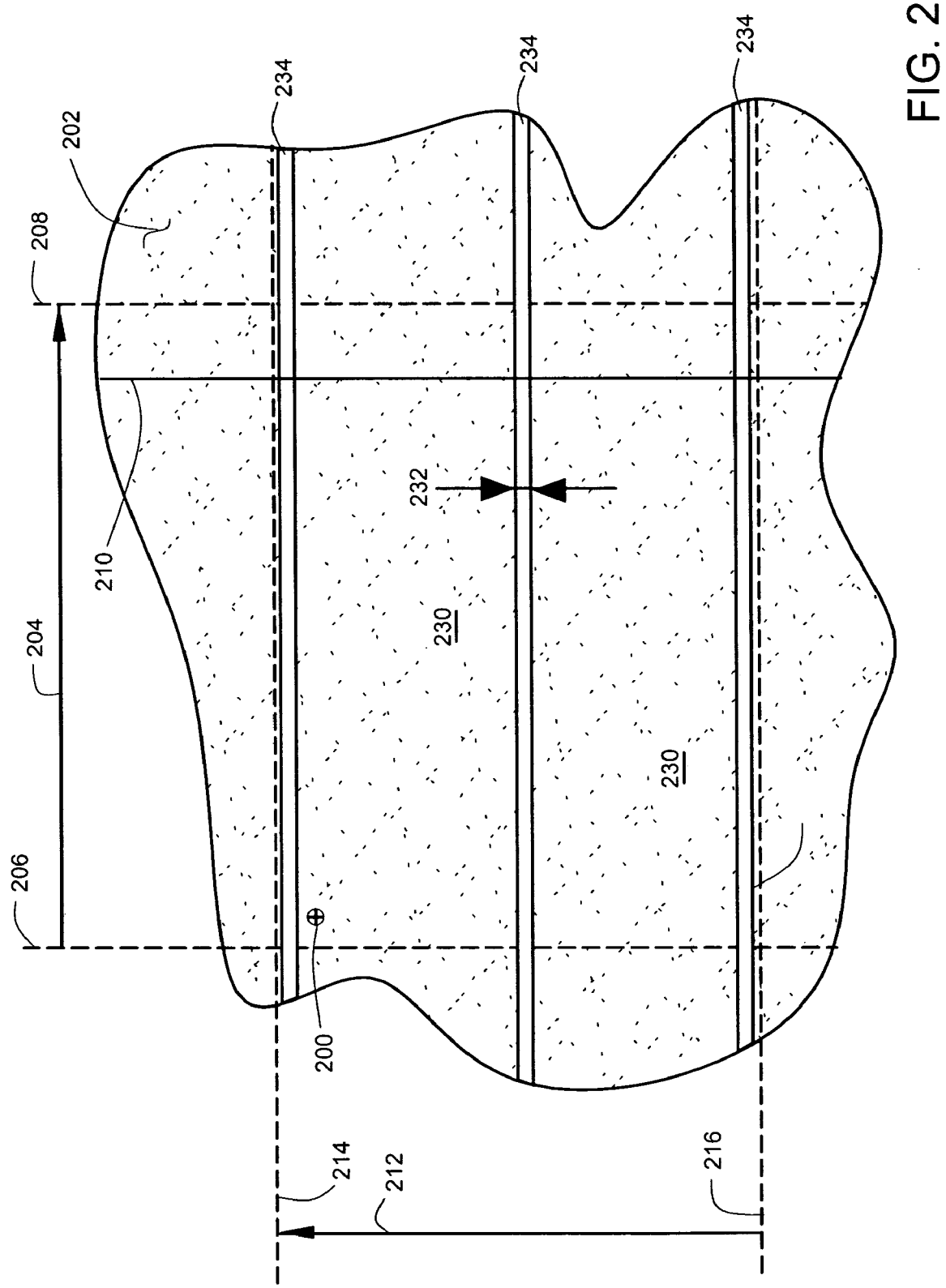
FIG. 2 illustrates a surface of ferroelectric storage media that is accessed by scanning motion of a contact.

FIG. 2 illustrates a surface of ferroelectric storage media 202 that is accessible by scanning motion of a tip 200 of a probe (such as probe 110 in FIGS. 1B, 1C). In this example, the surface 202 is movable by a first microactuator to move parallel to an axis 204 at least between a substrate motion limit line 206 and substrate motion limit line 208. The movement of the surface 202 aligns the probe with a selected track 210. The contact 200 is movable by a second microactuator to move parallel to an axis 212 at least between probe motion limit line 214 and probe motion limit line 216. The movement of the probe 200 aligns the probe 200 to travel along and scan data on a selected track such as track 210.

The storage media 202 includes second media regions 230 that comprise ferroelectric media having a rewritable polarization state. The second media regions 230 are indicated by a stippled appearance in FIG. 2. User data is stored in the second media regions 230. The second media regions 230 do not have a significant imprint.

The storage media 200 includes first media regions 234. The first media regions 234 are adjacent the second media regions 230. The first media regions 234 comprise imprinted ferroelectric media having a stable polarization state. The first media regions 234 are imprinted with position information, also called servo information. The polarization of the first regions 234 is made stable at the time of manufacture of the storage drive. The polarization of the first regions 234 is not erasable during normal storage drive operation. The first regions 234 have stable locations relative to the adjacent rewritable second media regions 230. The imprinted servo information read from the first regions 234 has a stable position relationship to a storage media 200. There is no risk of position creep of the servo data imprinted in first media regions 234. The imprinted ferroelectric media is preferably arranged in tracks as illustrated. The tracks have a track width 232 that is in the range of several tens of nanometers. The track width 232 is too narrow to be practically defined by lithographic patterning methods in which light sensitive layers are deposited on substrate surfaces, exposed and developed. The track width is defined by a process of ferroelectric imprinting with stable polarization. This imprinting process has adequate resolution to define such narrow tracks, and does not rely on lithographic methods. The process of imprinting with stable polarization includes exposing the first regions 234 to both energy and servo data patterns, and is described in more detail below in connection with FIGS. 3, 4.

Figure 3:
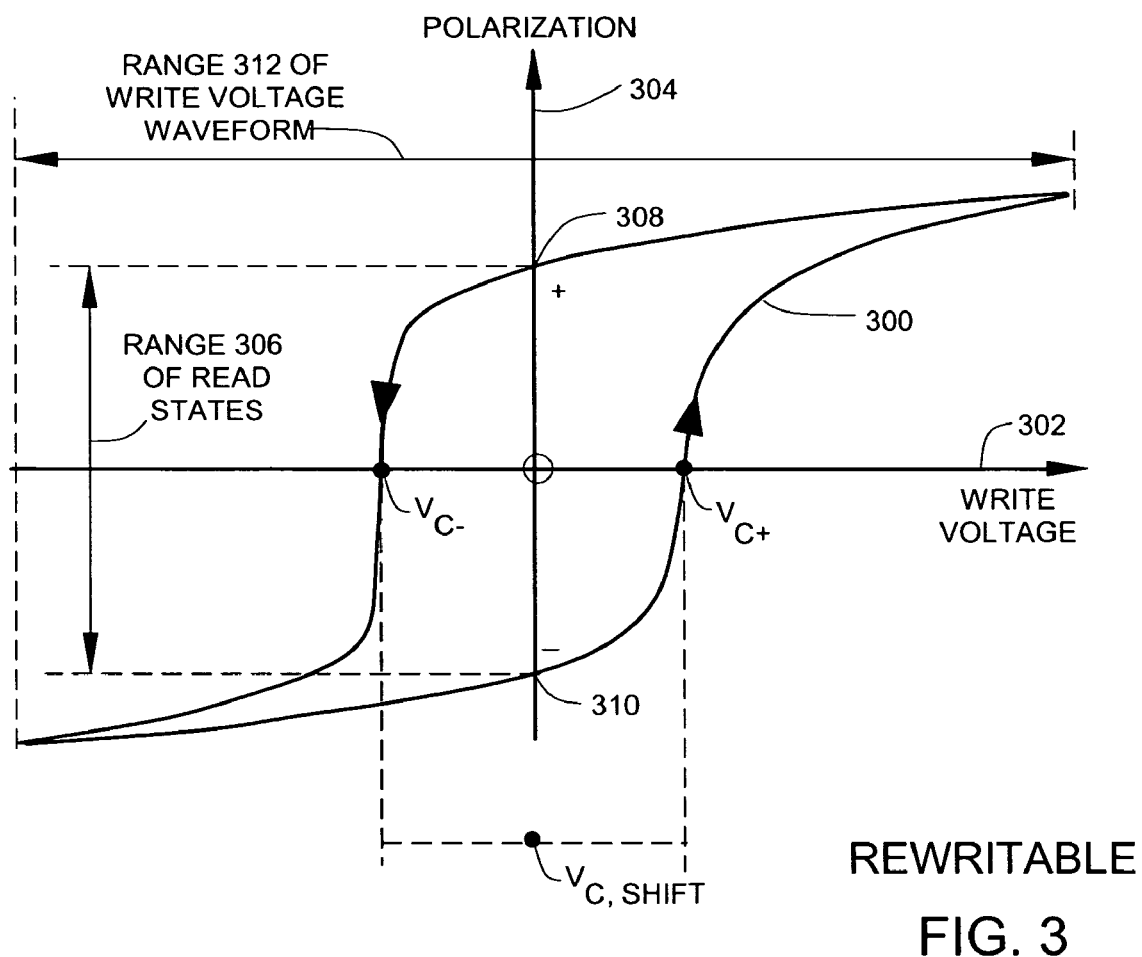
FIG. 3 illustrates a hysteresis loop of polarization of a ferroelectric material that is not imprinted.

FIG. 3 illustrates a typical hysteresis loop 300 of polarization of a ferroelectric material that is not imprinted. A horizontal axis 302 represents write voltage and a vertical axis 304 represents polarization. The range 312 of write voltages illustrated in FIG. 3 is a range of voltages suitable for writing data patterns. The range 312 of write voltages illustrated in FIG. 3 is less than needed to cause imprinting of the ferroelectric material. The exact shape of the hysteresis loop 300 varies depending on the particular ferroelectric material used. The hysteresis loop 300 has a range of read states 306 (at zero applied voltage) that ranges from a positive read state 308 to a negative read state 310. The read state can be changed to either a positive or negative read state by application of the appropriate write waveforms, and the ferroelectric material is thus a rewritable storage element useful for storing user data.

Figure 4A:
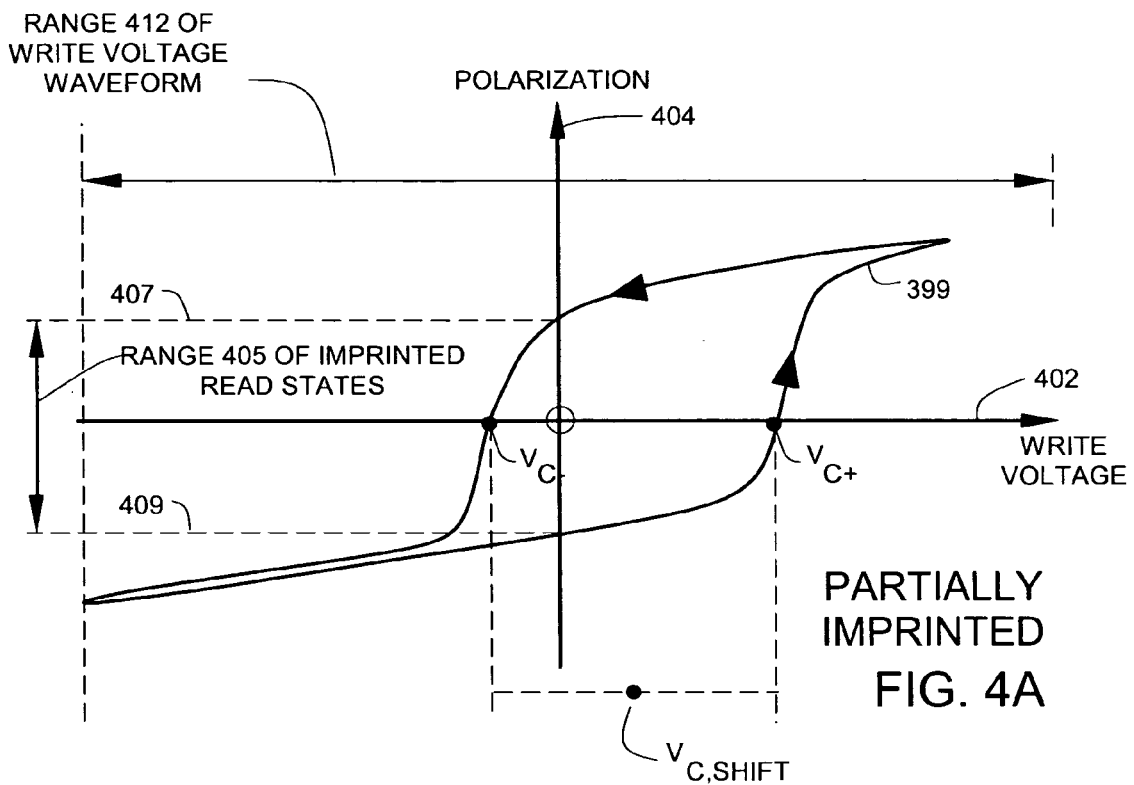
FIG. 4A illustrates a typical hysteresis loop of polarization of a ferroelectric material that is partially imprinted.

FIG. 4A illustrates a typical hysteresis loop of polarization of a ferroelectric material that is partially imprinted. A horizontal axis 402 represents write voltage and a vertical axis 404 represents polarization. The range 412 of write voltages illustrated in FIG. 4A is a range of voltages suitable for writing data patterns. The range 412 of write voltages illustrated in FIG. 4A is less than needed to cause electrical imprinting of the ferroelectric material. The exact shape of the hysteresis loop 400 varies depending on the particular ferroelectric material used and the imprinting process parameters. The hysteresis loop 400 has a range 405 of positive and negative polarity read state 407, 409 (at zero applied write voltage). The polarity is not stable over the range 406 of read voltage waveforms. The read polarity state is not permanently negative and can be changed by application of read waveforms, and the partially imprinted ferroelectric material is thus a storage element that is not permanent with respect to read voltage waveforms.

Figure 4B:
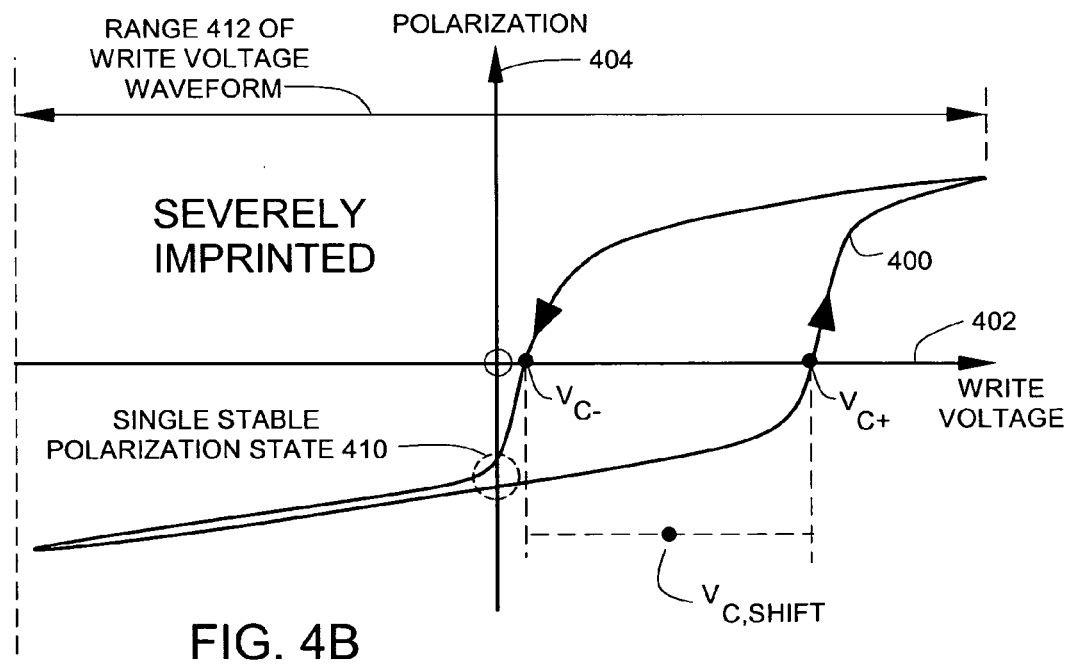
FIG. 4B illustrates a typical hysteresis loop of polarization of a ferroelectric material that is severely imprinted.

FIG. 4B illustrates a typical hysteresis loop 400 of polarization of a ferroelectric material that is severely imprinted. A horizontal axis 402 represents write voltage and a vertical axis 404 represents polarization. The range 412 of write voltages illustrated in FIG. 4B is a range of voltages suitable for writing data patterns. The range 412 of write voltages illustrated in FIG. 4B is less than needed to cause electrical imprinting of the ferroelectric material. The exact shape of the hysteresis loop 400 varies depending on the particular ferroelectric material used and the imprinting process parameters. The hysteresis loop 400 has a stable single polarity state 410 (at zero applied write voltage).

During the read operation the polarization state is temporarily switched from the stable negative polarization state to the unstable positive polarization state. This transition produces the sensed switching current due to the polarization reversal, just as for data bits. Immediately after the removal of the read voltage the polarization state spontaneously resets to the stable, negative, polarization state, so that a reset operation is not required for the imprinted servo mark.

The severely imprinted ferroelectric material is thus a storage element that is permanent with respect to read voltage waveforms, and is useful for formatting ferroelectric media with position information such as track numbers and the like that cannot be erased by the read waveform.

Imprinting as shown in FIGS. 3, 4A, 4B is known from portions of: "Imprint: An Important Failure Mechanism of Ferroelectric Thin Films in View of Memory Applications," Michael Grossmann, 2001. Read and write voltage waveforms for probe scanned ferroelectric media are known. FIGS. 3, 4A, 4B show hysteresis measurements of a 150 um PZT thin film before (FIG. 3), partially imprinted (FIG. 4A) and severely imprinted (FIG. 4B) imprinting by the application of energy. The energy can be, for example, in the form of ultraviolet (UV) radiation, application of pulsed voltages that are higher than the read voltage waveforms, or application of heat. 2001. Read and write voltage waveforms for probe scanned ferroelectric media are known.

Figure 5:
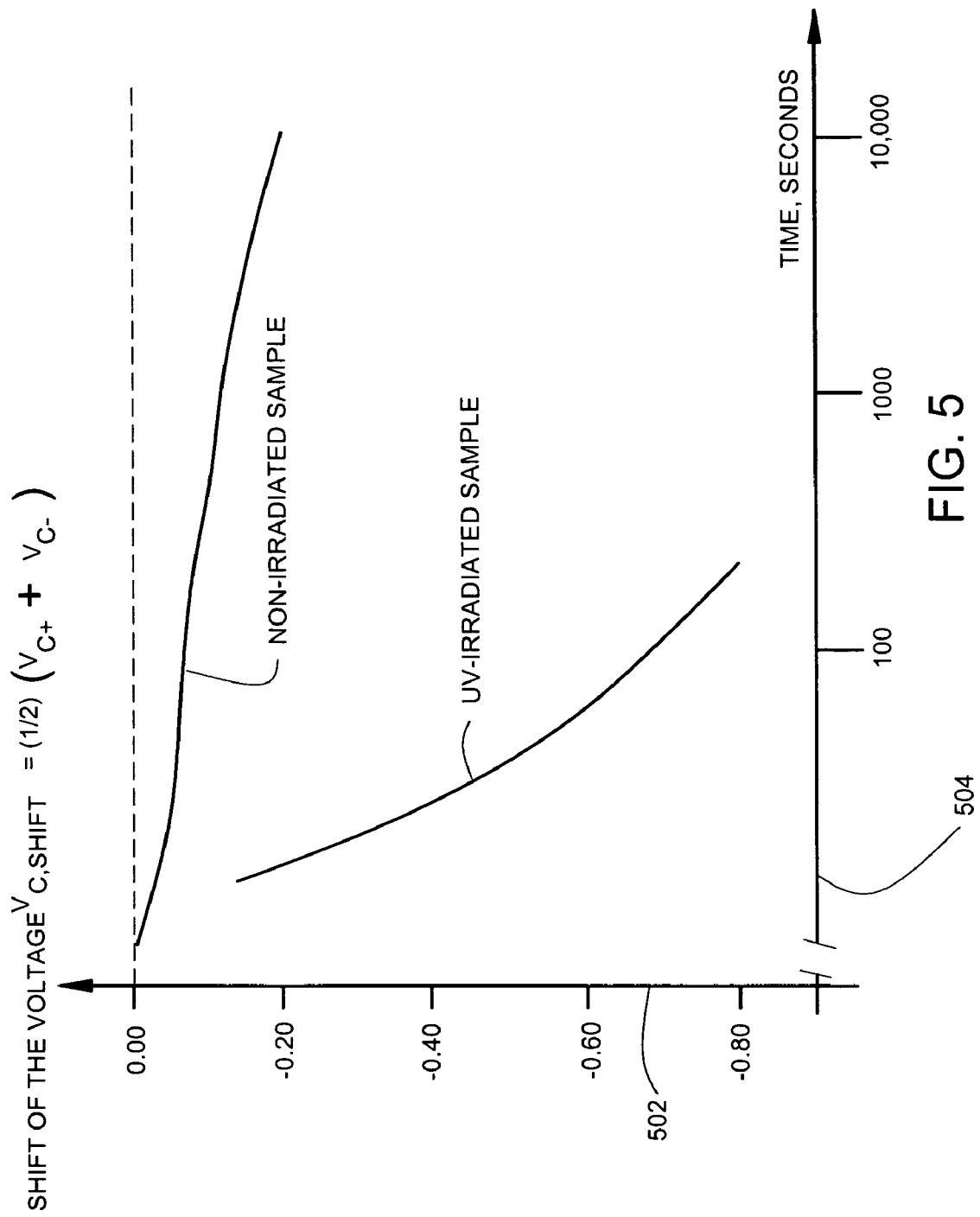
FIG. 5 shows a read voltage shift of hysteresis as a function of time.

FIG. 5 shows a graph of the comparative shift of hysteresis as a function of time for a first sample that is exposed to UV radiation and a second sample that is not exposed to UV radiation at room temperature. A vertical axis 502 represents the voltage shift away from an initial voltage value of $V_{c,shift}=(\frac{1}{2})(V_{c+}+V_{c-})$. A horizontal axis 504 represents elapsed time after polarization of the samples at time t=0. The horizontal axis 504 is a logarithmic axis.

In the case of UV irradiated sample, the voltage shifts much faster than the voltage shift of the non-irradiated sample. FIG. 5 shows that writing servo marks and then using UV-light to accelerate the imprint forms viable permanent servo marks in a localized area. The samples are tested at widely spaced time intervals to minimize error in drift due to testing.

The results for the UV-irradiated sample shows that, with radiation high enough to induce imprinting, the hysteresis loops shifts rapidly and the material becomes imprinted. If this drift continues long enough, the "average read state" shifts far enough so that the read state is a single stable polarity.

Figure 6:
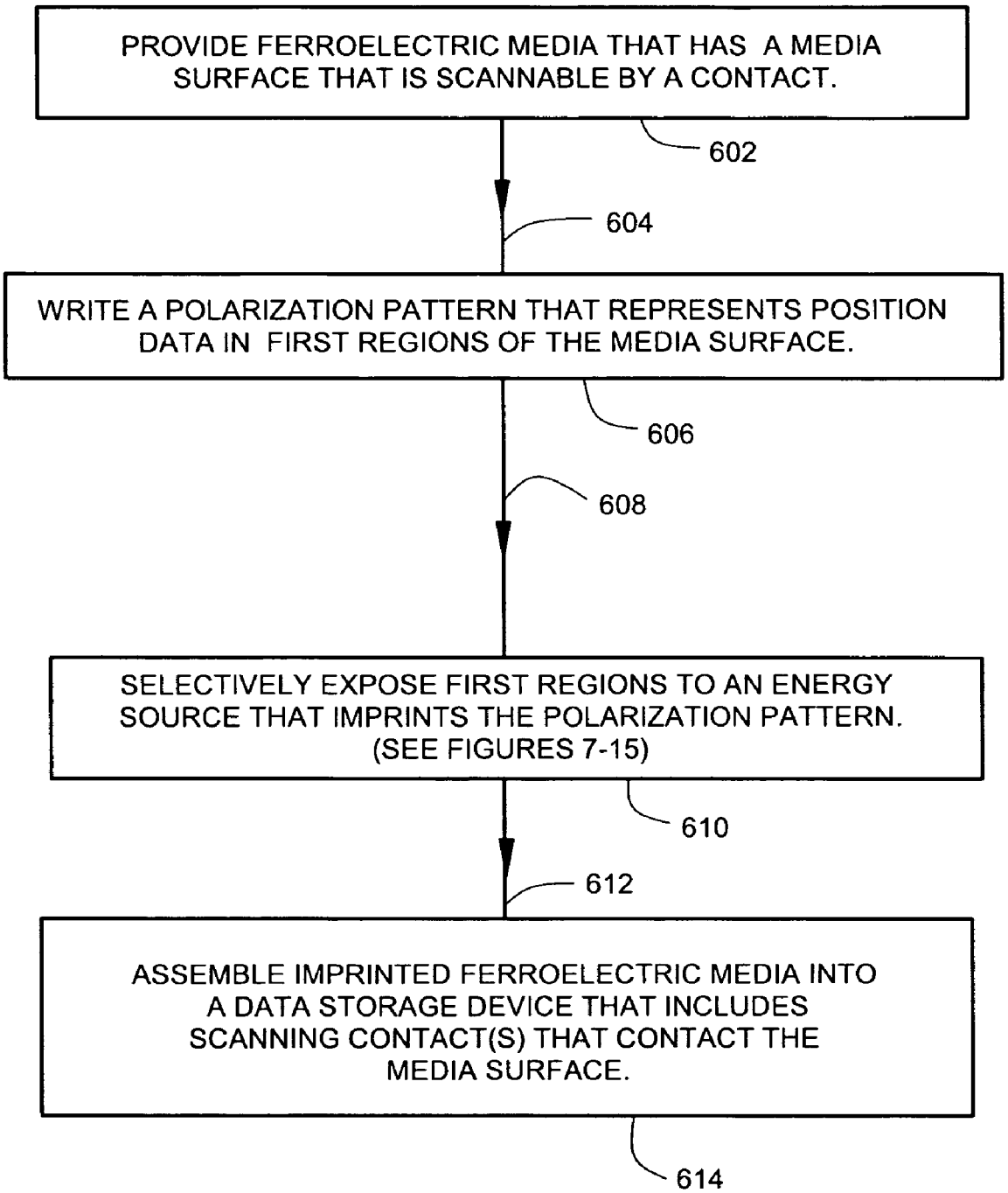
FIG. 6 illustrates a method of providing ferroelectric media that includes imprinted regions.

FIG. 6 illustrates a method of providing ferroelectric media that includes imprinted regions. The method begins at process 602 in which ferroelectric media is provided. The ferroelectric media includes a media surface that is scannable by a contact that provides a read signal. After completion of process 603, processing continues along line 604 to process 606.

At process 606, a polarization pattern is written in first regions (e.g., servo mark regions) of the media surface. The polarization patterns represent position data in the first regions of the media surface. After completion of process 606, processing continues along line 608 to process 610.

At process 610, the first regions are selectively exposed to an energy source that provides an imprint to the polarization pattern. The imprint prevents subsequent erasure of the polarization pattern by the read signal. After completion of process 610, processing continues along line 612 to process 614. Exemplary methods of exposing ferroelectric media to energy sources are described below in connection with FIGS. 7-15.

At process 614, the imprinted ferroelectric media is assembled into a data storage device that includes scanning contacts that contact the media surface.

Figure 7:
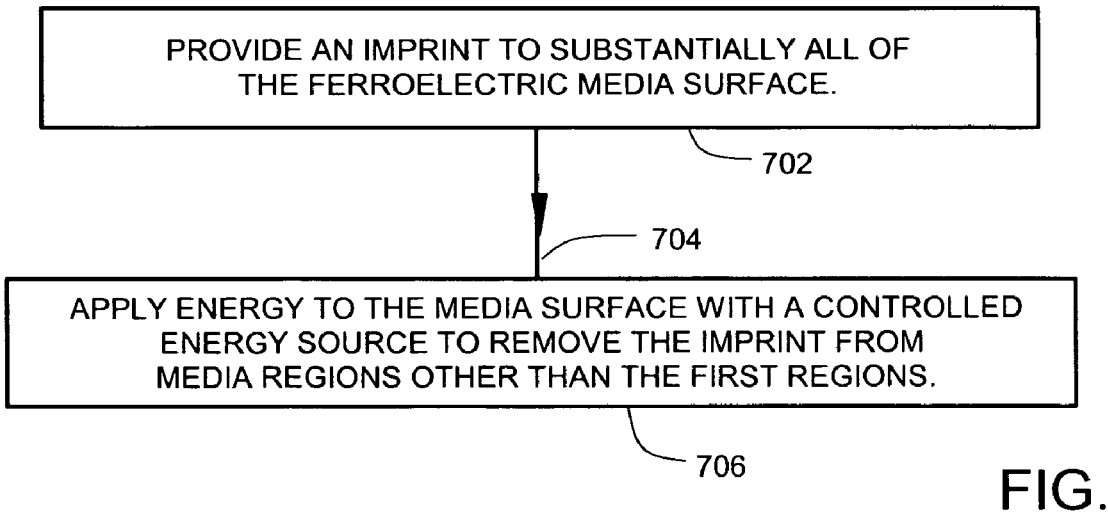
FIG. 7 illustrates one exemplary method of performing process 610 in FIG. 6.

In FIG. 7, processing begins at process 702 where an imprint is provided to substantially all of the ferroelectric media surface. After completion of process 702, processing continues along line 704 to process 706.

At process 706, energy is applied to the media surface with a controlled energy source to remove the imprint from media regions other than the first regions. Imprint removal is accomplished by applying energy from an energy source while the voltage applied to the media is a decaying sine wave that bring the polarization of the media to a near zero state. The energy source is then removed, and the media regions other than the first regions have the imprinting removed, leaving only the first regions imprinted.

Figure 8:
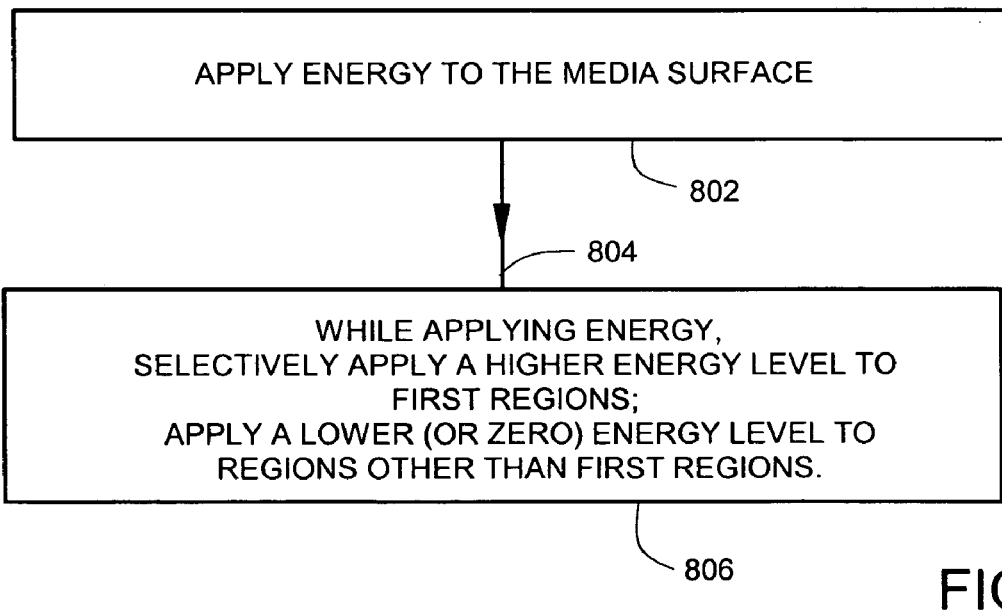
FIG. 8 illustrates an alternative exemplary process of performing process 610 in FIG. 6.

FIG. 8 illustrates an alternative exemplary process of performing process 610 in FIG. 6. In FIG. 8, processing begins at process 802 with application of energy to the media surface. During the application of energy to the media surface, processing continues along line 804 to process 806. Process 806 selectively controls the application of energy such that a higher energy level is applied to first regions, and a lower energy level (typically a zero level) is applied to media regions other than the first regions.

Figure 9:
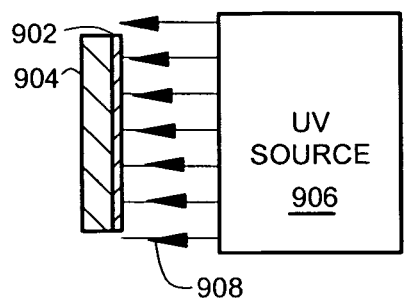
FIGS. 9-15 illustrate examples of methods of applying energy to ferroelectric media.
Figure 10:
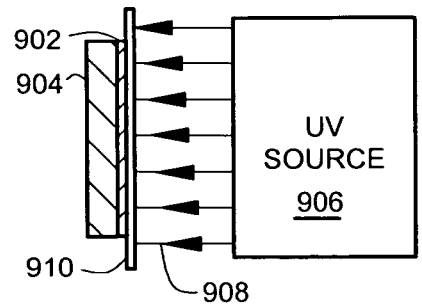
Figure 11:
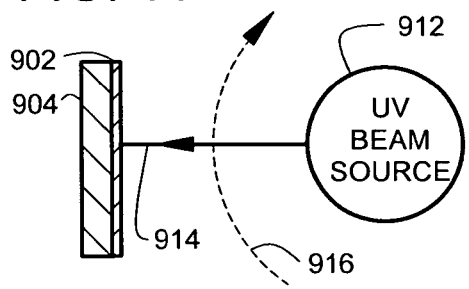

FIGS. 9-15 illustrate examples of methods of applying energy to ferroelectric media 902 on substrate 904. FIG. 9 illustrates use of a UV source 906 to illuminate the media 902 with UV radiation 908. FIG. 10 illustrates the use of a contact mask 910 so that UV radiation 908 is selectively blocked from some regions of media 902 while other regions of media 902 are exposed. Mask 910 is a film layer that is separate from the media 902. Mask 910 is not a deposit on media 902. FIG. 11 illustrates a scanning UV beam source 912 that provides a UV beam 914 that moves with a scanning motion over the surface of the media 902. UV beam source 912 is turned on and off while scanning to selectively expose certain regions. Such UV scanning is preferably done in a vacuum to enhance directionality of the beam 914.

Figure 12:
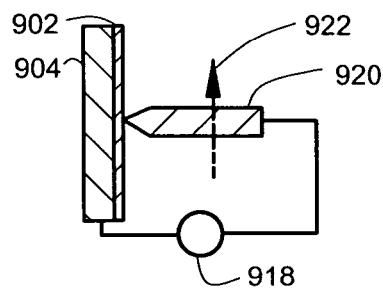
Figure 13:
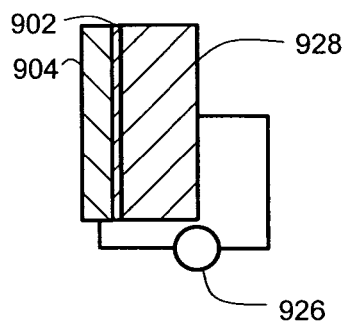

FIG. 12 illustrates application of a voltage pulse source 918 to the media 902 through a scanning probe 920 that has a scanning motion 922. The voltage pulse source 918 is selectively controlled to expose certain regions of the media 902 to the voltage pulse source 918. The voltage pulse source 918 provides voltage pulses that are higher than the read and write voltage ranges, and high enough to provide imprinting with repeated application. The voltage pulses selected depends on the media material properties and the thickness of the media layer. FIG. 13 illustrates application of a voltage pulse source 926 to media 902 by contact with a metal plate 928.

Figure 14:
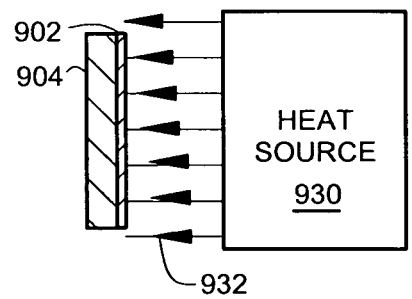
Figure 15:
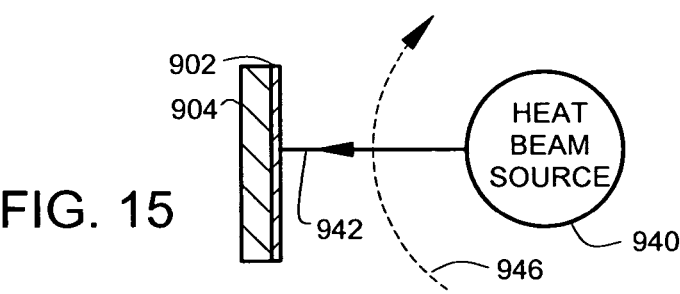

FIG. 14 illustrates a heat source 930 providing heat radiation 932 to media 902. The heat source 930 can comprise a laser heater or other known heat source. FIG. 15 illustrates a heat beam source 940 that provides a heating beam 942 with a scanning motion 946. The heat beam source can be any collimated light source, such as a laser, that delivers a heating energy beam with sufficient intensity to induce imprinting, or alternatively, to remove imprinting.

In a probe storage device employing an erase readback of a ferroelectric media, permanent (non-erasable) servo marks (reference marks) are provided for tracking. In magnetic hard drives, the permanent servo marks are written once in the same way the data is written on the magnetic storage layer and never overwritten (erased). In the case of the magnetic hard drive, the readback is non-erase, and the servo marks can be read back without changing them. In a ferroelectric storage device, the readback of data is destructive and the data needs to be rewritten after the data is read. A different way of creating permanent servo marks is needed for ferroelectric media. Permanent servo marks are needed for ferroelectric media. Such permanent servo marks preferably provide the same signal magnitude and shape as the data readback so that the servo marks and the data can be processed by a common read channel. This permits use of the permanent servo marks to adjust the amplification gain (automatic gain control or AGC) while reading back the permanent servo marks. The permanent servo marks preferably have a size that is on the order of the bit length of the data words. In case of a high-density storage device servo marks would ideally have length scales of the order of several 10's of nanometers. This requirement excludes any solution that involves lithography.

A probe head writes the servo marks into a designated area of the ferroelectric storage media and subsequently induce strong imprint in this area. The imprint is strong enough so that the ferroelectric media has only one stable polarization direction. It is known from research in the field of FRAM that heat, UV light or repeated voltage pulsing increases imprint. After writing in the servo marks designated areas, these areas could be locally heated, irradiated with UV light or multiple writing (voltage pulsing) of the servo marks would lead to a stable bit pattern that can not be changed any more with a standard readback waveform. If an erase readback waveform is applied to imprinted areas, the polarization would flip in accordance to the applied erase readback waveform, but immediately after the electric field is removed, due to the strong imprint, the polarization flips back into its imprinted polarization direction.

A probe storage device based on ferroelectric thin films uses one or more small, electrically conducting contacts as movable top electrodes to store binary information in spatially localized domains. Detecting the stray field generated from differently polarized domains (as it is done in magnetic hard disks) cannot be employed as readout mechanism because free electrical charges are going to screen the stray field. One possible readout mechanism would be an erase readback, where a biased probe head in contact with the media would be used to re-polarize the media and record the displacement current that is flowing to the probe head while uniformly repolarizing the media.

In order to find a block of data on the probe storage device there will be multiple ways to determine the position of the probe head relatively to the stored data. First there will be erasable servo marks that will be written at the beginning of every data track and erased while readback. These will ensure that the tip is moved to the center of the track, and will be rewritten with the data. Secondly capacitive sensors will be used to get "close" to the track position. A major disadvantage of capacitive sensors is that they are drifting over time. The drift of the capacitive sensors makes permanent servo marks on the media highly desirable for calibrating the capacitive sensors.

It is to be understood that even though numerous characteristics and advantages of various aspects of the invention have been set forth in the foregoing description, together with details of the structure and function of various aspects of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the probe scanned ferroelectric media system while maintaining substantially the same functionality without departing from the scope and spirit of the present invention. In addition, although the preferred aspect described herein is directed to flat media surfaces for scanning, it will be appreciated by those skilled in the art that the teachings of the present invention can be applied to other scanned surface shapes, without departing from the scope and spirit of the present invention.

What is claimed is:

1. A method comprising:

providing ferroelectric media that includes a media surface that is scannable by a contact that provides a read signal;

writing a polarization pattern representing position data in first regions of the media surface; and selectively exposing the first regions to an energy source that provides an imprint to the polarization pattern.

2. The method of claim 1 wherein the imprint prevents subsequent erasure by the read signal.

3. The method of claim 1, comprising:

selecting the energy source from the group of imprinting sources comprising: a voltage source, a heat source, an ultraviolet radiation source.

4. The method of claim 1 wherein the selective exposing comprises:

providing the imprint to substantially all of the media surface and then scanning with a controlled energy source to remove the imprint from media surfaces other than the first regions.

5. The method of claim 1 wherein the selective exposing comprises:
scanning the media surface with a controllable energy source, the controllable energy source applying a higher energy level to the first regions to provide the imprint, and the energy source applying a lower energy level that does not imprint to regions other than the first regions.

6. The method of claim 1, comprising:
including track number data in the first regions; and
using the track number data for seek control of a position of the probe.

7. The method of claim 1, comprising:
using the position data in first regions for adjusting automatic gain control of a read channel connected to the probe.

8. The method of claim 1, comprising:
writing an erasable data polarization pattern including user data in non-imprinted regions of the media surface, the data polarization pattern including erasable preambles.

9. The method of claim 8, comprising:
using the erasable preambles for tracking control of a position of the probe.

10. The method of claim 8, comprising:
using the erasable preambles for automatic gain control adjustment of a read channel connected to the probe.

11. A data storage device, comprising:
ferroelectric media that includes a media surface that is scannable by a contact;
a polarization pattern representing position data that is written in first regions of the media surface; and
an imprint to the polarization pattern in the first regions, wherein the imprint is not erasable during normal storage operations.

12. The data storage device of claim 11 wherein the imprint prevents erasure of the polarization pattern by the read signal.

13. The data storage device of claim 11 wherein the imprint is selected from the group of: a voltage imprint, a heat imprint, an ultraviolet radiation imprint.

14. The data storage device of claim 11, wherein the first regions include track number data for seek control of a position of the contact.

15. The data storage device of claim 11, wherein the position data in first regions adjusts automatic gain control of a read channel connected to the contact.

16. The data storage device of claim 11, comprising:
erasable data polarization pattern including user data written in non-imprinted regions of the media surface, the erasable data polarization pattern including erasable preambles.

17. The data storage device of claim 16 wherein the erasable preambles control tracking of a position of the probe.

18. The data storage device of claim 16, comprising:
a read channel connected to the probe and including an automatic gain control, and
the erasable preambles adjusting the automatic gain control.

19. Data storage media, comprising:
first media regions comprising imprinted ferroelectric media having a stable polarization state that is not erasable during normal storage operations; and
second media regions, adjacent the first media regions, comprising ferroelectric media having a rewritable polarization state.

20. The data storage media of claim 19 wherein the first media regions comprise servo control position data.

* * * * *